United States Patent Office 2,724,695
Patented Nov. 22, 1955

2,724,695
METHOD OF INHIBITING CORROSION OF METALS

William B. Hughes, Bartlesville, Okla., assignor to Cities Service Research and Development Company, New York, N. Y., a corporation of New Jersey No Drawing. Application April 27, 1953,
Serial No. 351,503

6 Claims. (Cl. 252—8.55)

This invention relates to inhibiting corrosion of metals and is more particularly concerned with improved compositions and processes for treating natural oil-brine mixtures to reduce their corrosive action upon production, transmission, and other oil field equipment.

It is a well-known fact that many oil producing formations yield with the crude oil a brine which is extremely corrosive in its action on metal tubing, casing, pumps, and other production and collection equipment, and that this type of corrosion is particularly noticeable in wells producing brines containing dissolved hydrogen sulfide, carbon dioxide, or other acidic materials. It has been discovered in the past that certain compounds containing imidazolidine rings, as disclosed in my copending application with Bennie Heinze, Serial No. 145,586, filed February 21, 1950, now U. S. Patent 2,643,227, and my copending application S. N. 212,681, filed February 24, 1951, now U. S. Patent 2,646,400, or imidazoline rings, as disclosed in U. S. Patent 2,466,517, to Blair et al., are effective, in sufficient concentration, to substantially inhibit such corrosion. It has more recently been found that these compositions have a very serious disadvantage, however, in that if their concentration in the brines is allowed to fall below an effective level, they appear to increase corrosion rather than to decrease it. The reason for this effect is not known, but it is believed that incomplete coverage of the surface of the metal to be protected by the corrosion inhbiting compositions may cause the corrosive elements of the oil-brine mixture to become concentrated at unprotected points, causing pitting and subsequent rapid and uncontrolled corrosion.

I have now discovered that compounds containing both the imidazoline ring and the imidazolidine ring do not, so far as my experiments would indicate, cause increased corrosion when present in amounts as small as 10 p. p. m., and will give effective protection at this low additive level. By contrast, inhibitors prepared according to the directions given in application Serial No. 145,586, now U. S. Patent 2,643,227, when present in the same brine oil mixture in concentrations of 10 p. p. m., may cause a corrosion increase of forty percent or more. It has also been found that my new inhibitors are effective to control corrosion when admixed with certain oil brine mixtures in which compounds containing the imidazoline or imidazolidine ring alone are not particularly effective in reducing corrosion. It will be understood, of course, that each oil well presents an individual problem in corrosion control, and that a composition may be effective at one location and not at another, where a different type of inhibitor may be effective. I have not, however, found my new inhibitors to be less effective than the imidazoline or imidazolidine type inhibitors in any oil-brine mixtures in which they have been tried.

My new inhibitors are formed by reacting equimolar quantity of a polyethylene amine, an aldehyde, and an acid under conditions such as to drive off water formed in the reaction to obtain a compound having the generic formula

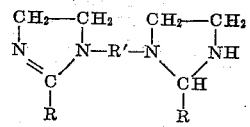

in which R may be alkyl, aryl, or hydrogen, and in which R' is the polyethylene amine residue. Amines suitable for use in formulating my new inhibitors include triethylene tetramine, hereinafter referred to as TETA, tetraethylene pentamine, hereinafter referred to as TEPA, and higher polyethylene amines. Aldehydes found suitable for use include formaldehyde, heptaldehyde, and other aliphatic aldehydes, and aromatic aldehydes such as benzaldehyde. Heterocyclic aldehydes such as furfural are, however, apparently unsuitable for use in my new inhibitors, since such tests as I have run indicate that compounds formulated with furfural tend to increase, rather than decrease, corrosion. Acids suitable for use include aliphatic acids such as acetic acid, oleic acid, and acids of intermediate molecular weight and aromatic acids such as benzoic acid. I prefer to choose my particular acids and aldehydes in such manner that the two R's in the above formula contain at least about six carbon atoms, since compounds formulated with lower acids and aldehydes alone are somewhat water soluble, and tend to wash out of the oil phase of the oil-brine mixture, thus reducing their effectiveness, even though such compounds still show considerable corrosion-inhibiting effects.

In preparing my new corrosion-inhibitors I may mix together equimolar quantities of polyethylene amine and either acid and aldehyde, theerafter heating the mixture to boiling while collecting water of reaction overhead until a quantity of water equal to almost the theoretical amount which would be evolved by the reaction of the carbonyl or carboxylic oxygen with amine hydrogen has been collected. The mixture is then cooled, the other ingredient is added, and the mixture is again heated to boiling to drive overhead water formed by the reaction of the intermediate product with the last added ingredient. In order to make the reaction mass more fluid, and to assist in carrying the water overhead, an entrainer such as benzene or toluene may be present during the reaction and distillation.

In order that those skilled in the art may more fully appreciate the nature of my invention and the manner in which my new inhibitors are formulated, the following examples are given.

*Example I*

To 189 grams of TEPA (1 mol), 114 grams of heptaldehyde (1 mol) were added. The mixture was charged to a flask equipped with a water trap, 50 ml. of toluene were added, and the mixture was heated to reflux temperature. At the end of 1½ hours of refluxing, 17.7 grams of water has been collected overhead, representing a 98% reaction. One mol (280 g.) of oleic acid was then added and reflux was resumed until water was no longer taken overhead (about 4 hours). At this point 34.8 grams of water were found in the water trap indicating a 96.7% reaction. The toluene was then removed by distillation, leaving a viscous, oil-soluble material that was readily dispersible in water.

*Example II*

One hundred and forty-six grams (1 mol) of TETA and 280 grams (1 mol) of oleic acid were combined with stirring. The pasty mass thus formed was mixed with 50 ml. of toluene and the whole was changed to a flask fitted with a water trap. The mixture was then heated to boiling and water was collected overhead until 35 grams (about 2 mols) had come over. The mixture was then cooled to room temperature and 33 grams (1 mol) of 90% paraformaldehyde were added. Reflux was then resumed and continued until approximately 18 grams of water were collected in the decanter still head. The toluene was then removed by distillation leaving a dark brown viscous material. The following physical properties of the product after water washing to remove unreacted amine, were determined:

|  | Found | Theoretical for $C_{25}H_{48}N_4$ |
|---|---|---|
| Molecular weight | 408 | 404 |
| Percent nitrogen | 13.2 | 13.7 | indicating that the material formed is largely

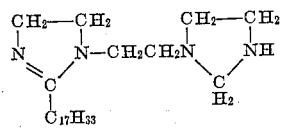

The effectiveness of my compositions in inhibiting the corrosiveness of oil field brines may be better and more fully understood by reference to certain tests which I have conducted using natural brines taken from producing wells together with oil from the same well. The test procedure involved a measurement of the corrosive action of these well fluids as inhibited with the compositions described above upon thoroughly cleaned and polished strips of No. 18 gauge hot rolled steel strips ½ inch by 3¾ inches in size, under conditions closely approximating those existing in a producing oil well, and a comparison thereof with the results obtained by subjecting identical test strips to the corrosive action of well fluids alone.

Cleaned and numbered one-quart bottles were purged with natural gas. Oil saturated with hydrogen sulfide by bubbling the gas through the liquid for about three hours was added to the half-full mark on the bottle. Brine containing carbon dioxide, and also saturated with hydrogen sulfide was added to almost completely fill the bottle. A quantity of my new compounds was then added to each bottle in amounts ranging from 50 to 10 parts per million, based on the oil content of the bottle. The weighed steel strips were then affixed to the end of a glass rod in such a manner that two pieces of Tygon tubing prohibited contact between the strip and the glass while a third piece of tubing held the strip firmly in position. The length of the glass rod was such that the mid-point of the test strip was approximately at the interfacial level when the rod itself was held in the bottle by a tightly fitting one-holed rubber stopper.

At all times precautions were maintained to exclude air from the bottles by frequent and liberal purging with oxygen-free natural gas. The bottles containing the oil, the brine, and the strips were then mounted upon the periphery of a horizontal drum, which was slowly revolved so as to alternately bring the surface of the steel strip in contact with the oil and with the brine. At the end of two weeks the bottles were taken off the drum and the strips removed. The strips were first washed in kerosene and then methanol, and finally water, prior to cleaning. Cleaning consisted of carefully treating in one weight per cent hydrochloric acid solution for a few seconds at a time, washing with water, and thoroughly wiping with cheese cloth between each acid treatment. When the original lustre had been restored as nearly as possible with a minimum amount of acid treating, the strips were again washed in methanol followed by acetone. The dry strips were then reweighed to determine the weight loss; blanks were run to provide a basis for comparison.

The changes in the weight of the test strips during the corrosion test were taken as a measurement of the effectiveness of the inhibitor compositions. Thus I calculated a protection percentage for each of the test strips taken from the inhibited well fluids in accordance with the following formula:

$$\frac{L1-L2}{L1} \times 100$$

in which L1 is the loss in weight of strips taken from uninhibited well fluids, and L2 is the loss in weight of strips which were subjected to the inhibited well fluids.

The corrosion inhibiting effects of my new compositions as compared to the protection given by a generally very effective composition prepared according to the disclosure of application S. N. 145,586, now U. S. Patent 2,643,227 taken as a standard, may be observed in the following tables, showing test results made with brine-oil mixtures of varying corrosiveness. Table I shows test results with a brine-oil mixture in which the standard composition was not effective at concentrations below 50 p. p. m., Table II shows test results with a brine-oil mixture in which it was not particularly effective at concentrations below 25 p. p. m., and Table III shows test results with a brine-oil mixture in which it gave but little protection in concentrations as high as 50 p. p. m. In the table, A represents an inhibitor which is the reaction product of one mol of TETA and one mol of formaldehyde, neutralized with 4 mols of oleic acid, prepared according to the directions given in S. N. 145,586, now U. S. Patent 2,643,227. The balance of the compositions were made according to the present disclosure, with the following reagents in equimolar proportions:

X1—TEPA, oleic acid, formaldehyde
X2—TEPA, oleic acid, heptaldehyde
X3—TEPA, acetic acid, heptaldehyde
X4—TETA, oleic acid, formaldehyde
X5—TEPA, oleic acid, benzaldehyde
X6—TEPA, acetic acid, benzaldehyde
X7—TEPA, benzoic acid, formaldehyde
X8—TEPA, benzoic acid, heptaldehyde
X9—TEPA, benzoic acid, benzaldehyde

TABLE I

| Inhibitor | Percent Protection at 50 p. p. m. | Percent Protection at 25 p. p. m. | Percent Protection at 10 p. p. m. |
|---|---|---|---|
| A | 90.5 | corrosive | corrosive |
| X1 | 94.6 | 91.0 | 87.8 |
| X2 | 99.2 | 91.7 | 88.9 |
| X3 | 98.9 | 55.6 | 53.3 |
| X4 | 98.7 | 91.1 | 88.4 |

TABLE II

| Inhibitor | Percent Protection at 25 p. p. m. | Percent Protection at 10 p. p. m. |
|---|---|---|
| A | 88.2 | 42.5 |
| X1 | 97.5 | 84.9 |
| X2 | 97.4 | 86.6 |
| X3 | 97.5 | 84.5 |
| X4 | 97.9 | 88.1 |

TABLE III

| Inhibitor | Percent Protection at 50 p. p. m. |
|---|---|
| A | 14.0 |
| X5 | 97.8 |
| X6 | 87.6 |
| X7 | 69.9 |
| X8 | 75.5 |
| X9 | 87.6 |

It will be apparent that my new compositions give excellent protection at all concentrations tested, and that at concentrations even as low as 10 p. p. m. they are effective to reduce corrosion by almost 90%, whereas at higher concentrations they virtually eliminate corrosion.

In using my improved compositions for protecting oil well tubing, casing, and other equipment which comes in contact with the corrosive oil-brine production, I find that excellent results may be obtained by injecting an appropriate quantity of a selected composition into a producing well so that it may mingle with the oil-brine mixture and come into contact with the casing, tubing, pumps, and other producing equipment. I may, for example, introduce the inhibiting composition into the top of the casing, thus causing it to flow down into the well and thence back through the tubing, etc. In general, I have found that this procedure suffices to inhibit corrosion throughout the entire system of production, and collection, even including field tankage.

The nature of the inhibiting action of my improved compositions is not fully understood, but apparently the compositions act to preferentially wet the surface of the metal equipment with oil, thus excluding brine from contact with the metal. In any event, however, no matter what the mechanics of the corrosion inhibiting may be, they are extremely and surprisingly effective in protecting metal parts from corrosion even when used in amounts of ten parts per million or less based on the oil content of the well fluids.

It is to be understood that the improved compositions of my invention are not limited to use alone and may be employed along with other agents commonly introduced into producing oil wells for breaking emulsions, limiting scale formation, etc. It is further evident that my invention is not restricted to the use of improved compositions for inhibiting corrosion in oil wells but may be employed to perform this function in the presence of corrosive brines of other origin.

Having now described my invention, what I claim as new and useful is:

1. The method of preventing the corrosion of metals when exposed to contact with corrosive oil well fluids which comprises incorporating into the well fluids a small but sufficient amount of a compound having the generic formula

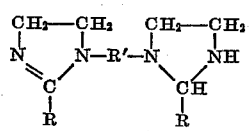

in which R is selected from the group consisting of alkyl and aryl radicals and hydrogen atoms, and the total of carbon atoms in both R's is at least 6, and R' is a polyethylene amine residue.

2. The method of preventing the corrosion of metals when exposed to contact with corrosive oil well fluids which comprises incorporating into the well fluids a small but sufficient amount of a compound having the formula

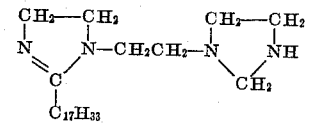

3. The method of preventing the corrosion of metals when exposed to contact with corrosive oil well fluids which comprises incorporating into the well fluids a small but sufficient amount of a compound having the formula

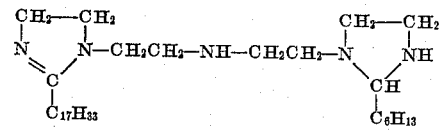

4. The method of preventing the corrosion of metals when exposed to contact with corrosive oil well fluids which comprises incorporating into the well fluids a small but sufficient amount of a compound having the formula

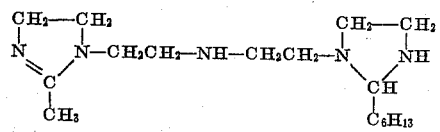

5. The metal for preventing the corrosion of metals when exposed to contact with corrosive oil well fluids which comprises incorporating into the well fluids a small but sufficient amount of a compound having the formula

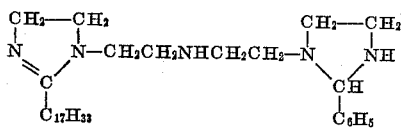

6. The method of preventing the corrosion of metals when exposed to corrosive oil well fluids which comprises incorporating into the well fluids a small but sufficient amount of a compound having the formula

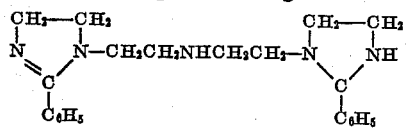

References Cited in the file of this patent

UNITED STATES PATENTS

| | | |
|---|---|---|
| Re. 23,227 | Blair et al. | May 9, 1950 |
| 2,583,399 | Wachter et al. | Jan. 22, 1922 |
| 2,640,029 | Blair et al. | May 26, 1953 |
| 2,643,227 | Hughes et al. | June 23, 1953 |